(12) United States Patent
Behling

(10) Patent No.: US 11,421,532 B2
(45) Date of Patent: *Aug. 23, 2022

(54) PLUG FOR A VOID, SYSTEM AND METHOD

(71) Applicant: Joshua Stephen Behling, Vineyard, UT (US)

(72) Inventor: Joshua Stephen Behling, Vineyard, UT (US)

(73) Assignee: Strata Products Worldwide, LLC, Sandy Springs, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,265

(22) Filed: Nov. 30, 2020

(65) Prior Publication Data

US 2021/0115793 A1    Apr. 22, 2021

Related U.S. Application Data

(60) Continuation of application No. 16/654,697, filed on Oct. 16, 2019, now Pat. No. 10,851,652, which is a division of application No. 15/993,018, filed on May 30, 2018, now Pat. No. 10,550,695.

(51) Int. Cl.
*E21F 15/06* (2006.01)
*E21F 15/08* (2006.01)
*E21F 15/00* (2006.01)

(52) U.S. Cl.
CPC ............ *E21F 15/005* (2013.01); *E21F 15/06* (2013.01); *E21F 15/08* (2013.01)

(58) Field of Classification Search
CPC ........ E21D 9/001; E21D 9/002; E21F 15/005; E21F 15/06; E21F 15/08

USPC ...................... 405/266, 267, 269; 299/11, 12
See application file for complete search history.

(56) References Cited

U.S. PATENT DOCUMENTS

| | | | | |
|---|---|---|---|---|
| 3,927,719 A | * | 12/1975 | Maser ...................... | E21F 15/08 169/46 |
| 4,966,237 A | * | 10/1990 | Swanson .................. | C09K 8/50 166/281 |
| 5,342,149 A | * | 8/1994 | McCabe ............. | E04G 23/0203 239/416.4 |
| 5,419,632 A | * | 5/1995 | Stephens ................. | B28C 5/386 366/3 |
| 5,645,375 A | * | 7/1997 | Stephens ................. | E21D 9/002 405/146 |
| 6,428,107 B1 | * | 8/2002 | Sun ......................... | C04B 28/08 299/11 |
| 6,874,976 B2 | * | 4/2005 | Shimada .................. | E02D 3/12 405/266 |

(Continued)

FOREIGN PATENT DOCUMENTS

| | | | | |
|---|---|---|---|---|
| FR | 2457964 A1 | * | 12/1980 | ............. E21D 9/002 |
| FR | 2484529 A2 | * | 12/1981 | ............. C08L 61/04 |

*Primary Examiner* — Frederick L Lagman
(74) *Attorney, Agent, or Firm* — Ansel M. Schwartz

(57) ABSTRACT

A plug for a void in a mine to divert water having a rigid closed cell foam which fills the void. The rigid closed cell foam having a plurality of pipes disposed within the foam. The pipes distributed throughout the void. The pipes are positioned in the foam so the pipes are staggered in length vertically with respect to various heights in the void, and the pipes are positioned in the foam every 4' to 6' horizontally with respect to the void. Each pipe has a mixing stick. A method for diverting water from a void in a mine.

6 Claims, 12 Drawing Sheets

(56) References Cited

U.S. PATENT DOCUMENTS

| | | | | |
|---|---|---|---|---|
| 7,462,001 | B2* | 12/2008 | Canteri | E04G 23/02 |
| | | | | 405/267 |
| 7,682,107 | B2* | 3/2010 | Crayne | E21F 15/10 |
| | | | | 405/263 |
| 10,024,157 | B2* | 7/2018 | Fairhurst | E21F 5/02 |
| 10,550,695 | B2* | 2/2020 | Behling | E21F 15/06 |
| 10,851,652 | B2* | 12/2020 | Behling | E21F 15/06 |

* cited by examiner

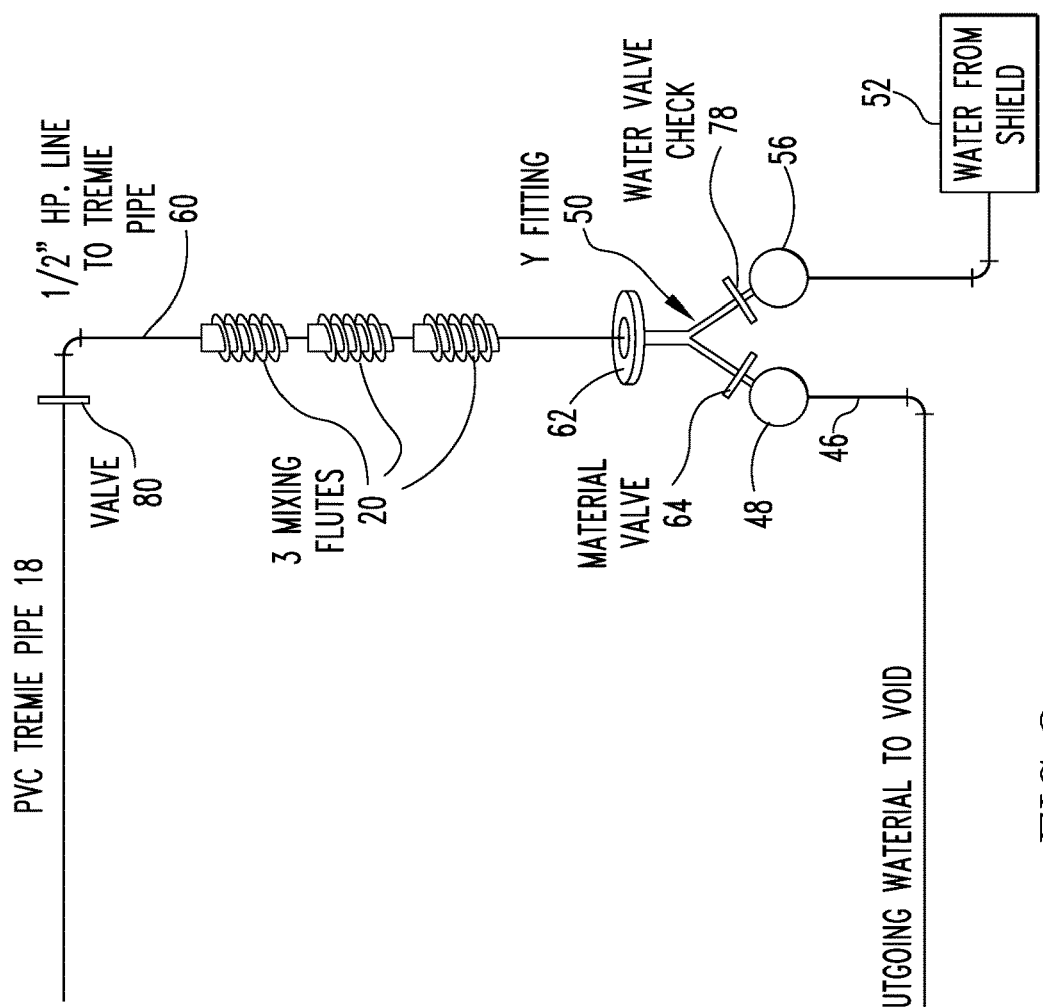
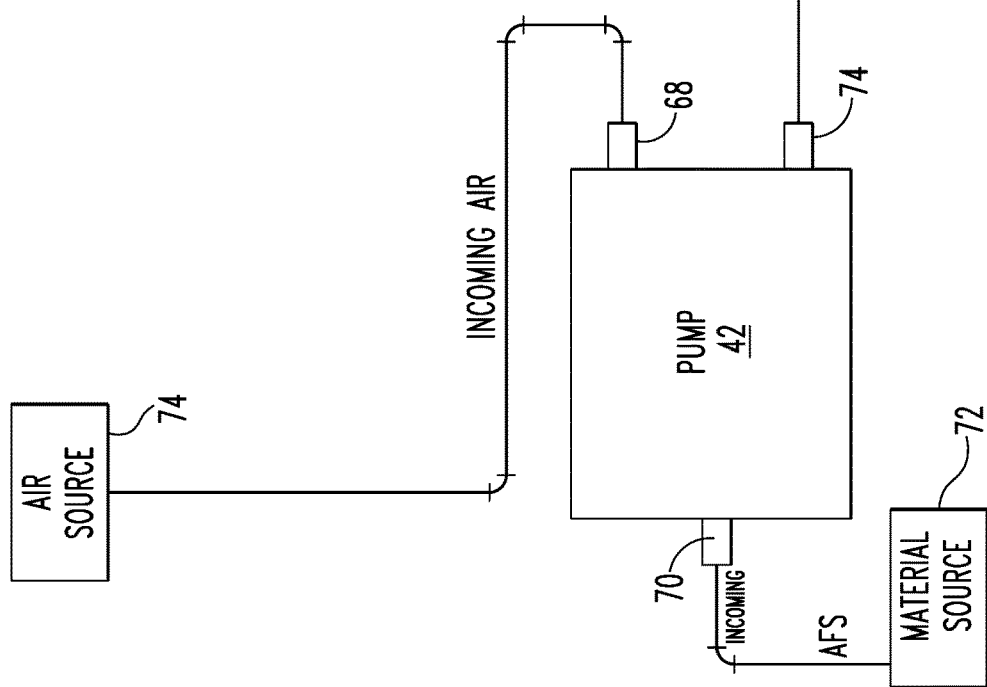
FIG.2

PLUG FOR A VOID, SYSTEM AND METHOD

CROSS-REFERENCE TO RELATED APPLICATIONS

This is a continuation of U.S. patent application Ser. No. 16/654,697 filed Oct. 16, 2019, now U.S. Pat. No. 10,851,652, which is a divisional of U.S. patent application Ser. No. 15/993,018 filed May 30, 2018, now U.S. Pat. No. 10,550,695 issued Feb. 4, 2020, all of which are incorporated by reference herein.

FIELD OF THE INVENTION

The present invention is related to a plug in a void of a longwall being mined for coal. (As used herein, references to the "present invention" or "invention" relate to exemplary embodiments and not necessarily to every embodiment encompassed by the appended claims.) More specifically, the present invention is related to a plug in a void of a longwall being mined for coal where the plug is a rigid closed cell foam which fills the void having a plurality of pipes disposed within the foam.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Longwall mining is by far the most efficient means of extracting coal in underground mines today. The longwall system consisting of the shearer, conveyor system, and hydraulic roof supports (shields) is constructed on one end of solid block of coal that ranges between 1000' and 1,500' wide, and 2 to 4 miles long. Once constructed the longwall system mines that entire block of coal taking cuts (passes) across the width of the panel (the face). As the coal is being mined across the face, the roof above must be temporarily supported to prevent the collapse of the material above. Once the shields advance to support newly exposed roof, they allow material that was once above them, to fall behind them.

The efficient advancement of these shield supports is where the present invention plays a key role. At times in Longwall mining, the immediate roof can deteriorate drastically between the time a cut is made, and the advancement of the shield supports. In some cases, the roof conditions can be so poor that the roof begins to fall immediately as the longwall mining machine cuts the face. When this occurs, a void is created above the shields that: 1) causes more material to fall onto the conveyor; usually in the form of large unmanageable pieces, and 2) prevents further advancement of the shields. The shield supports are connected to the conveyor system. Their progression consists of 1) collapsing to the point where they are no longer in contact with the roof, 2) advancing forward to support newly exposed roof, 3) repressurizing against the roof, and 4) pushing the conveyor system forward to position it for the longwall shearer's next pass along the face. If the shields extend fully but are unable to pressurize against the mine roof due to a void, the conveyor system cannot move forward and thus the longwall mining process is stopped. While the process is stalled with exposed rock above, gravity continues to act on the exposed rock causing more material to fall. The more rock that falls, the larger the existing void becomes. The larger the void becomes, the more rock falls, and so on. The amount of time that gravity is allowed to act on a particular area of unsupported top also serves to worsen the circumstances.

BRIEF SUMMARY OF THE INVENTION

The present invention pertains to a plug for a void in a mine. The plug comprises a rigid closed cell foam which fills the void having a plurality of pipes disposed within the foam. The pipes distributed throughout the void. The pipes are positioned in the foam so the pipes are staggered in length vertically with respect to various heights in the void, and the pipes are positioned in the foam every 4' to 6' horizontally with respect to the void. Each pipe has a mixing stick.

The present invention pertains to a method for forming a void in a mine. The method comprises the steps of adding a catalyst to a single component material. There is the step of providing the single component material with the catalyst to a pump which pumps only the single component material with the catalyst. There is the step of supplying air to the pump at a minimum of 90 psi while the pump is pumping the single component material with the catalyst through a first hose attached to a first port of a y fitting. There is the step of supplying water at a minimum of 60 psi through a second hose to a second port of the y fitting so the water and single component material with the catalyst merge in the y fitting to create a product. The catalyst used being a function of ambient temperature about the void and the water temperature. There is the step of placing the product with a third hose that extends from the y fitting on the outer most areas of the void and pumping back to the middle of the void, where the product expands when the product releases into the void from the third hose and cures to a rigid closed cell foam to form a plug in the void.

The present invention pertains to a system for making a plug in a void of a mine having a pressurized air source and a pressurized water source. The system comprises a material source of a single component material. The system comprises a pump having an air pump inlet to receive air from the air source and a material pump inlet to receive the material from the material source which pumps the material with the air at a minimum pressure of 90 psi out a pump outlet. The system comprises a first hose attached to the pump outlet through which the air and material is pumped from the pump. The system comprises a second hose attached to the water source which receives water from the water source at least at a pressure of 60 psi. The system comprises a y fitting having a first port to which the first hose is attached which receives the air and material from the first hose, a second port to which the second hose is attached to receive water from the second hose, and a third port from which a product formed from the water from the second hose and the material and air from the first hose flows out. The system comprises a third hose attached to the third port which receives the product from the y fitting, the third hose having a mixing stick disposed in the third hose. The system comprises a plurality of pipes to be disposed in the void which are configured to be connected sequentially with the third hose through which product from the third hose flows into and through and out the pipes to foam and form the plug.

BRIEF DESCRIPTION OF THE SEVERAL VIEWS OF THE DRAWING

In the accompanying drawings, the preferred embodiment of the invention and preferred methods of practicing the invention are illustrated in which:

FIG. 2 is a schematic representation of the system of the claimed invention.

DETAILED DESCRIPTION OF THE INVENTION

Figure 1:
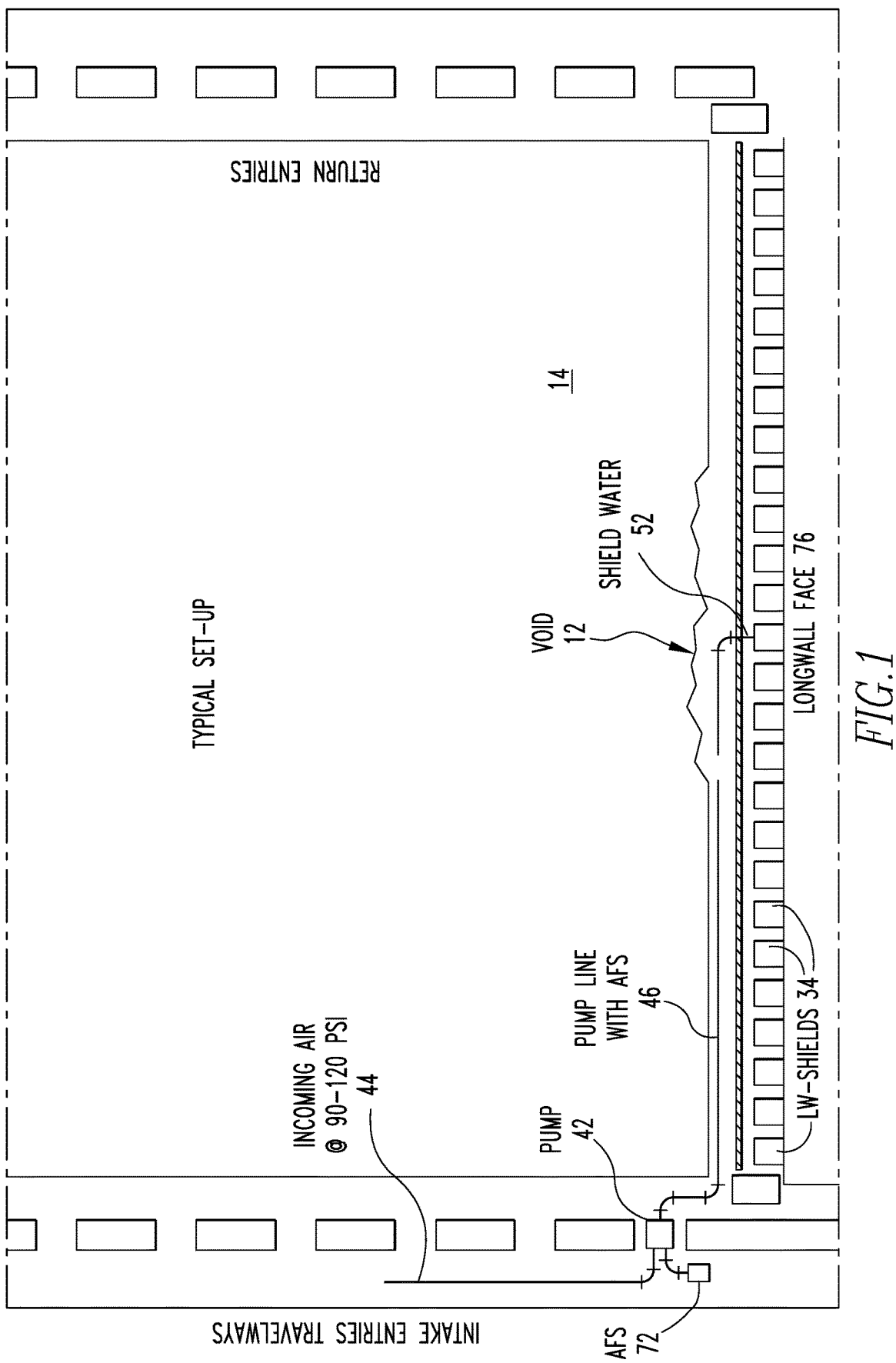
FIG. 1 is a schematic representation regarding the setup of the claimed invention in a mine.

Referring now to the drawings wherein like reference numerals refer to similar or identical parts throughout the several views, and more specifically to FIGS. 1, 3, 4, 7 and 8 thereof, there is shown a plug 10 for a void 12 in a mine 14. The plug 10 comprises a rigid closed cell foam 16 which fills the void 12 having a plurality of pipes 18 disposed within the foam 16. The pipes 18 distributed throughout the void 12. The pipes 18 are positioned in the foam 16 so the pipes are staggered in length vertically with respect to various heights in the void 12, and the pipes 18 are positioned in the foam 16 every 4' to 6' horizontally with respect to the void 12. Each pipe has a mixing stick 20.

Figure 5:
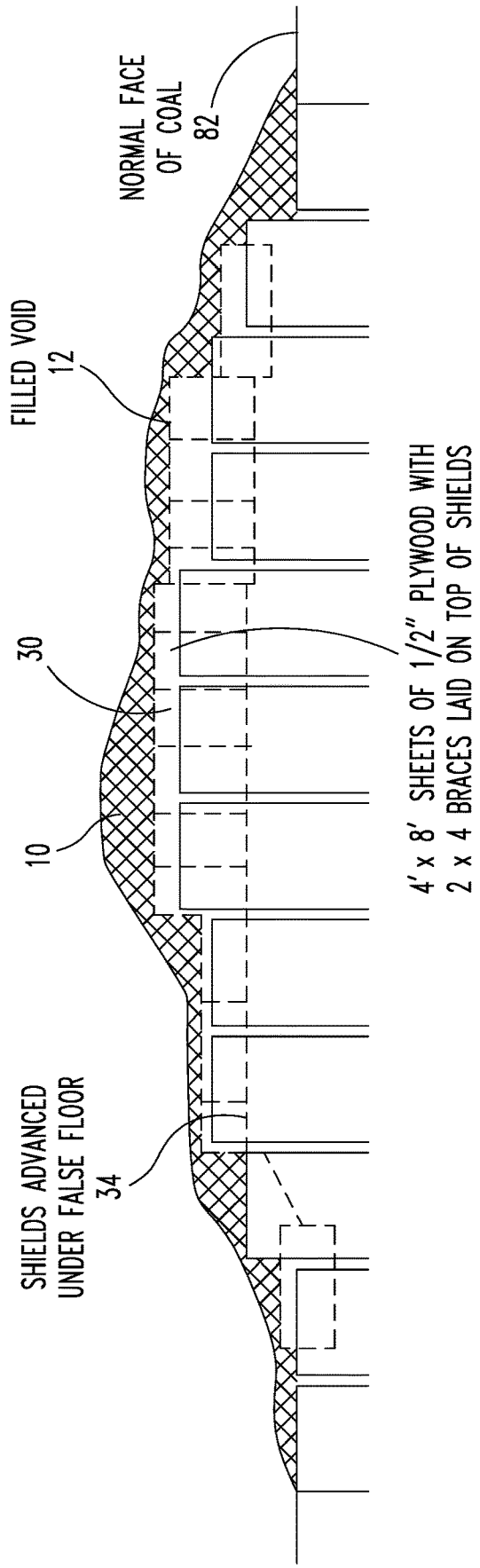
FIG. 5 is a top view of shields advanced once the plug with a false bottom is formed in the void in the mine.
Figure 6:
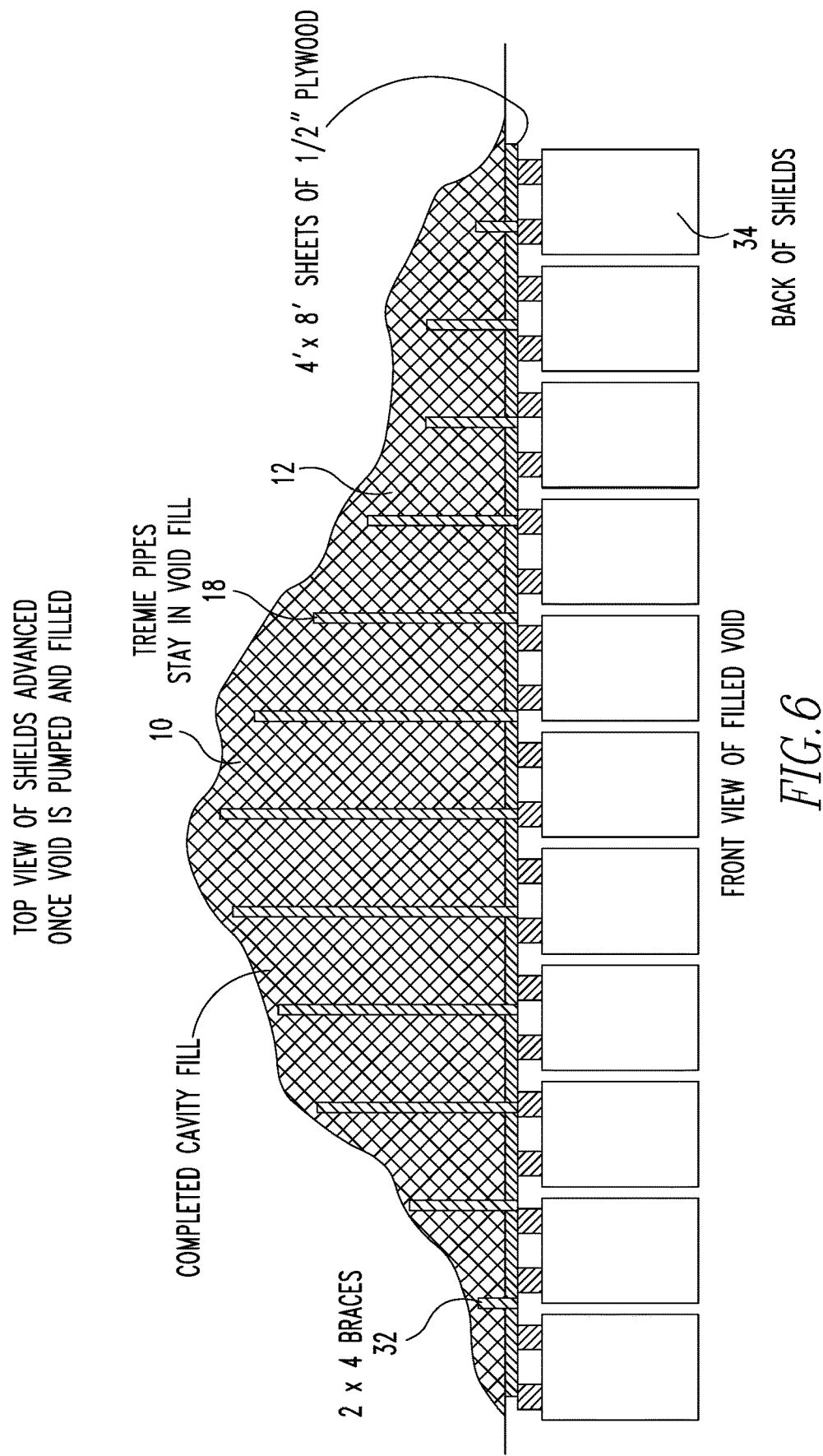
FIG. 6 is a front view of plug with a false bottom in a void in a mine.
Figure 7:
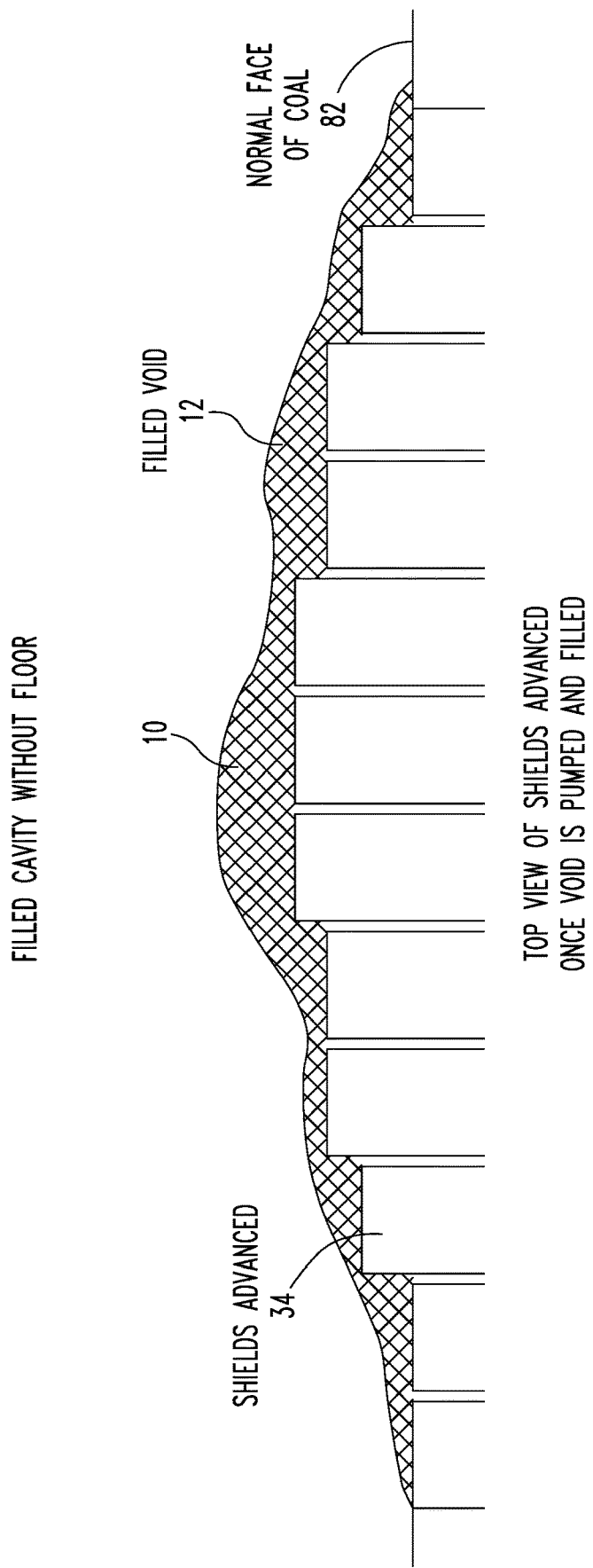
FIG. 7 is a top view of shields advanced once the plug without a false bottom is formed in a void in a mine.
Figure 8:
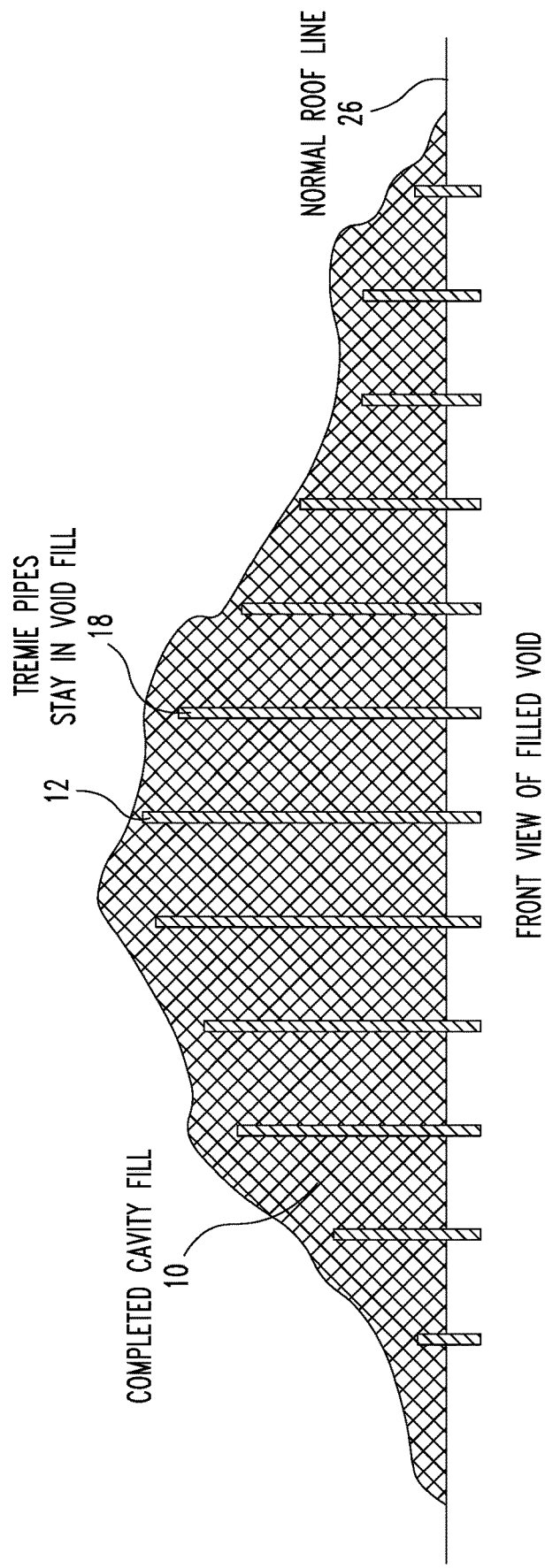
FIG. 8 is a front view of a plug without a false bottom which has filled a void in the mine.

The pipes 18 may be disposed in the plug 10 at least about every 10 feet apart lengthwise across the plug 10 and about at least every 5 feet apart depth wise across the plug 10. The plug 10 may include a false floor 28 from which the pipes 18 extend into the hardened foam 16, as shown in FIGS. 5 and 6.

The present invention pertains to a system 66 for making a plug 10 in a void 12 of a mine 14 having a pressurized air source 44 and a pressurized water source 52, as shown in FIG. 2. The system 66 comprises a material source 72 of a single component material 40. The system 66 comprises a pump 42 having an air pump inlet 68 to receive air from the air source 44 and a material pump inlet 70 to receive the material 40 from the material source 72 which pumps the material 40 with the air at a minimum pressure of 90 psi out a pump outlet 74. The system 66 comprises a first hose 46 attached to the pump outlet 74 through which the air and material 40 is pumped from the pump 42. The system 66 comprises a second hose 54 attached to the water source 52 which receives water from the water source 52 at least at a pressure of 60 psi with a water valve 78 to stop or start the flow of water. The system 66 comprises a y fitting 50 having a first port 48 to which the first hose 46 is attached which receives the air and material 40 from the first hose 46, a second port 56 to which the second hose 54 is attached to receive water from the second hose 54, and a third port 62 from which a product 58 formed from the water from the second hose 54 and the material 40 and air from the first hose 46 flows out. The system 66 comprises a third hose 60 attached to the third port 62 which receives the product 58 from the y fitting 50, the third hose 60 having a mixing stick 20 disposed in the third hose 60. The system 66 comprises a plurality of pipes 18 to be disposed in the void 12 which are configured to be connected sequentially with the third hose 60 through which product 58 from the third hose 60 flows into and through and out the pipes 18 to foam 16 and form the plug 10.

The present invention pertains to a method for forming a void 12 in a mine 14. The method comprises the steps of adding a catalyst 38 to a single component material 40. There is the step of providing the single component material 40 with the catalyst 38 to a pump 42 which pumps only the single component material 40 with the catalyst 38. There is the step of supplying air to the pump 42 at a minimum of 90 psi while the pump 42 is pumping the single component material 40 with the catalyst 38 through a first hose 46 attached to a first port 48 of a y fitting 50. There is the step of supplying water at a minimum of 60 psi through a second hose 54 to a second port 56 of the y fitting 50 so the water and single component material 40 with the catalyst 38 merge in the y fitting 50 to create a product 58. The catalyst 38 used being a function of ambient temperature about the void 12 and the water temperature. There is the step of placing the product 58 with a third hose 60 that extends from the y fitting 50 on the outer most areas of the void 12 and pumping back to the middle of the void 12, where the product 58 expands when the product 58 releases into the void 12 from the third hose 60 and cures to a rigid closed cell foam 16 to form a plug 10 in the void 12.

There may be the step of placing a plurality of pipes 18 throughout the void 12. The placing the product 58 step may include the steps of connecting the third hose 60 to a first pipe 22 of the plurality of pipes 18 and flowing the product 58 to the first pipe 22 so the product 58 flows out of the first pipe 22 into the void 12, after which the product 58 foams and hardens. The first pipe 22 having a mixing stick 20 across which the product 58 flows in the first pipe 22. There may be the step of connecting the third hose 60 to a second pipe 24 of the plurality of pipes 18 and flowing the product 58 through the second pipe 24 so the product 58 flows out of the second pipe 24 into the void 12, after which the product 58 foams and hardens.

There may be the steps of disconnecting the third hose 60 on the first pipe 22, closing a material valve 64 to stop flow of material 40 to the Y fitting 50 and flushing the third hose 60 clean with water flowing from the water inlet of the Y fitting 50. The placing the pipes 18 step may include the step of placing pipes 18 in the void 12 at least about every 10 feet apart lengthwise across the void 12 and about at least every 5 feet apart depth wise across the void 12. The placing the product step includes the steps of creating pockets in the plug being formed when the product cures and hardens and then placing the product from the third hose into the pockets through pipes 18 disposed in the pockets to strengthen the plug against forces. The placing the pipes 18 step may include the step of placing a false floor 28 at the void 12 with a long wall shield. The pipes 18 extending from the false floor 28 into the void 12.

In the operation of the invention, a plug 10 is created in a void 12 in a mine 14, as shown in FIG. 2. The present invention utilizes Strata AFS foam 16 to form the plug 10. The Strata AFS is a high expansion foam 16 material 40 that when properly applied as described herein, can expand up to 30 times its size. The application of this product 58 into the void 12 above the longwall 76 shields 34 both consolidates all the loose rock and creates a "false floor 28" that is able to withstand the set pressure of the longwall 76 shields 34 allowing them to advance.

The plug 10 is formed with a pump 42 positioned in one of the intake entries travelways of the mine 14 and fluidically connected at an air inlet of the pump 42 to an incoming air supply line in the mine 14, as shown in FIG. 1. The incoming air supply line is at a pressure of between 90 and 120 psi and is commonly found in a mine 14. The material 40, properly mixed with catalyst 38, is provided to the material 40 pump inlet. A first end of a first half-inch diameter wire braided flexible hose 46 is fluidically connected to a pump outlet 74 of the pump 42 and extends to a position in proximity to the void 12 in the mine 14 that is to be plugged. The length of the first wire braided flexible hose 46 could be several hundred feet long.

A second end of the first wire braided flexible hose 46 is fluidically connected through a material valve 64 to a first port 48 of a Y fitting 50 to provide material 40 pumped by the pump 42 to the Y fitting 50. A water line is fluidically connected with a second hose 54 through a water valve to a second port 56 of the Y fitting 50 to provide water to the Y fitting 50. The water provided to the Y fitting 50 is at 60 psi or greater and comes from a long wall shield in proximity to the void 12. In this way, the water line need only be about 30 to 50 feet long since it is coming from a long wall shield that is already positioned near the void 12. As an aside, as is customary, long wall shields 34 will be lined up along the long wall face 82 of the mine 14.

Fluidically connected to a product 58 outlet/third port 62 of the Y fitting 50 is a first end of a third half-inch diameter wire braided flexible hose 60. Inside the third half-inch diameter wire braided flexible hose 60 are three mixing sticks 20 in series, with each mixing stick 20 having 12 flutes, so there is a total of at least 36 flutes inside the third wire braided flexible hose 60. A second end of the third wire braided flexible hose 60 is fluidically connected to a pipe valve 80 of each pipe, in turn, to provide flowing product 58 to each pipe.

Figure 3:
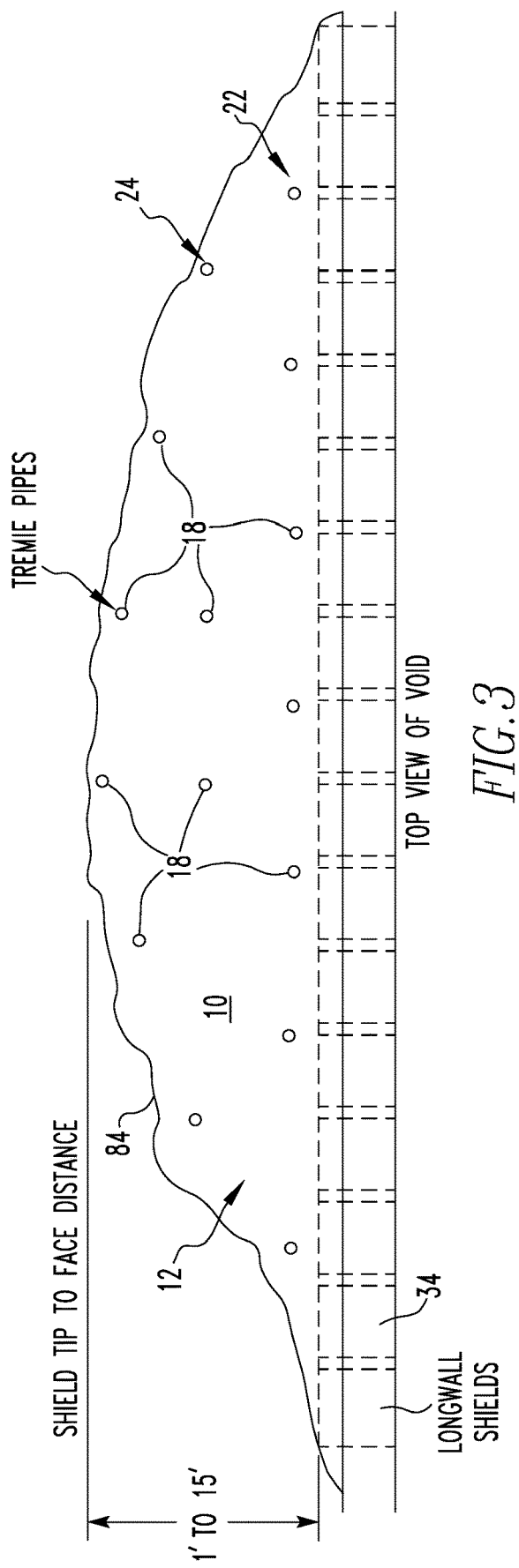
FIG. 3 is a top view of a plug of the claimed invention in a void in a mine.
Figure 4:
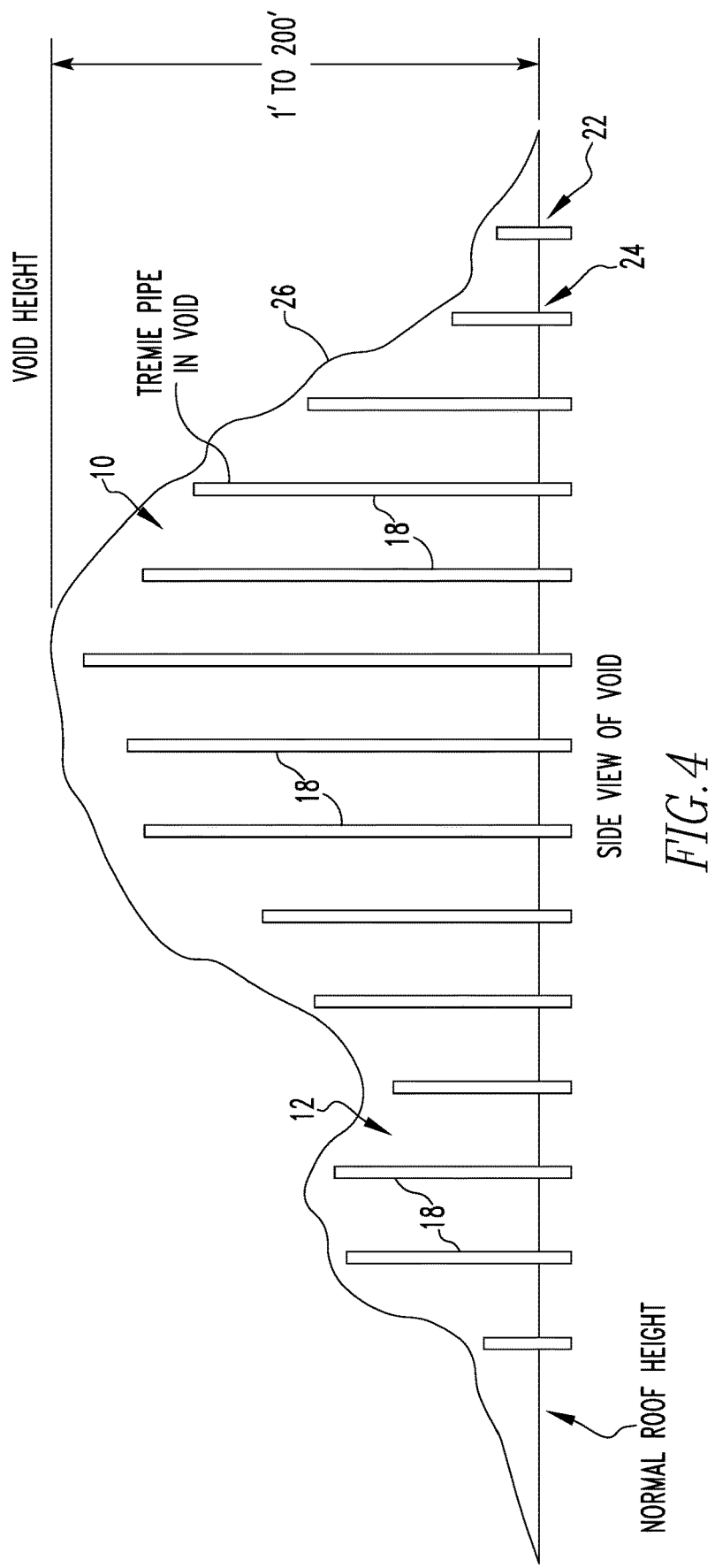
FIG. 4 is a side view of a plug in a void in a mine.

In the void 12 to be plugged, pipes 18 are positioned to prepare the void 12 for the plug 10 formation. Pipes 18 are positioned vertically about every 10 to 12 feet in the void 12 along the length of the void 12 and at the front of the void 12, as shown in FIGS. 3 and 4. FIG. 3 shows a top view of the void 12 with pipes 18 in the mine 14 and FIG. 4 shows a side view of the void 12 with pipes 18 in the mine 14. Furthermore, additional pipes 18 are positioned vertically in the void 12 and offset about 1 to 2 feet inward into the void 12 from the pipes 18 positioned along the length of the void 12 and at the front of the void 12. More pipes 18 are further offset 1 to 2 feet inward into the void 12 from the additional pipes 18, as needed, until the depth of the void 12 is populated with vertically position pipes 18. In this way, the void 12 is populated with pipes 18 from the walls that define the void 12 going forward to the front of the open face 82 of the void 12.

If the strata of the void 12 roof 26 has a rock or boulder structure or formation into which the top of the pipes 18 can be inserted to hold the pipes 18 in place, the pipes 18 which populate the void 12 are held in place by being inserted between the rocks or boulders at the void 12 roof 26, squeezed into the cracks between the rocks or boulders along the roof 26. If the void 12 roof 26 is generally clear, without any type of rock or bolder structure in which the tops of the pipes 18 can be inserted so they can be held by the rock a bolder structure, a false floor 28 is used instead to hold the pipes 18 in position inside the void 12. The false floor 28 may be formed of plywood boards 30 that have holes drilled in the boards 30, into which the pipes 18 are inserted, by which the pipes 18 are held in the board. The bottom of the pipes 18 with their valves, extend below the board. The plywood boards 30 with the pipes 18 sticking up, are positioned on the long wall shields 34 so the plywood boards 30 extend out from the long wall shields 34 into the void 12 so the pipes 18 are positioned in the void 12 to populate the void 12. The pipes 18 are typically half-inch diameter PVC pipe schedule 80.

Once the pipes 18 are in position in the void 12 and the y fitting 50 is connected to the first and third wire braided flexible hoses and the second hose 54 of the water line, the material 40 is provided to the pump 42 along with the air and the pump 42 is activated so the material 40 with air is pumped out of the pump 42 at a rate of about 18 to 40 L per minute to the Y fitting 50, where the material 40 mixes with the water from the water source 52; and additionally experiences further mixing as the material 40 and the water pass through the flutes of the three mixing sticks 20 in the third hose 60 to create the product 58. The mixing sticks 20 create a turbulent flow in the mixed water and material 40 which enhances and facilitates the mixing of the material 40 and the water to the desired level so that when the resultant product 58 flows out of the top of the pipe, it immediately starts to foam 16.

The second end of the third wire braided flexible hose 60 is attached to a pipe valve 80 at the bottom of the pipe. The pipe valve 80 at the bottom of the pipe is open to allow the product 58 to flow through the pipe and out the top of the pipe. The pipe has a generally cylindrical wall which is solid so all of the product 58 pumped into the pipe only flows out of the top of the pipe and into the void 12.

When the product 58 leaves the top of the pipe, it immediately begins to foam and spreads out as more product 58 flows out of the pipe. The face 82 of the foam 16 that forms as the product 58 first comes out of the pipe continues to spread out from the pipe into the void 12 as it begins to cure until it hardens within about a minute to two minutes. At some point within 1 to 2 minutes, the face 82 of the foam 16 will have hardened enough that it forms a wall causing the product 58 that comes out behind the foam 16 face 82 to start backing up and becoming more dense as the pressure builds from the product 58 that continues to come out of the pipe, but now cannot continue to flow because the face 82 of the product 58, and the product 58 that has come out already has hardened. As the product 58 is continued to be pumped into the pipe, the product 58 will harden and eventually back up in the pipe until the pipe at or near the pipe valve 80 at the bottom of the tremie valve will fracture or burst because all of the product 58 that has flowed out of the third wire braided flexible hose 60 has hardened and effectively formed a wall preventing any further product 58 flowing through the pipe. At this point, the only place for the product 58 flowing out of the third wire braided flexible hose 60 into the pipe to go is to fracture or burst the bottom of the pipe. When the material 40 is mixed, the appropriate catalyst 38 is added to the material 40, based on the conditions in the void 12, so the product 58 will start foaming immediately after the product 58 leaves the pipe.

The pipes 18 that are positioned at the outermost edge of the void 12 along the void 12 wall, have product 58 pumped through them first, so that the plug 10 is built up from the outer edges of the wall of the void 12 in, so the foam 16 that has hardened from a pipe can then be used to build and extend the plug 10 by having the foam 16 from a new pipe use the already hardened foam 16 from a previous pipe as a platform to further extend the plug 10. In regard to FIG. 3, for example, the three pipes 18 that are closest to the right side of the void 12 have product 58 flowed through them first, one at a time, as described above. Next, the three leftmost pipes 18 in the void 12 have product 58 flowed through them. Then, the next three leftmost pipes 18 in the void 12 have product 58 flowed through them, and then the next three rightmost pipes 18 in the*void 12 have product 58 flowed through them. In regard to FIG. 3, which is a top view of the void 12, the proximity of the back of the void 12 in relation to the pipes 18 is also taken into account so that the foam 16 hardens and builds out from the back extremity of the void 12 in towards the center and front of the void 12. In this way, the plug 10 is slowly built up to fill the void 12. The pipes 18 remain inside the hardened foam 16. Once the product 58 has foamed and hardened throughout the void 12, the plug 10 that is formed can withstand at a load of at least 4000 psi, whether it be from the mine 14 or water flowing in the mine 14.

After the pumping of product 58 to a pipe is complete, by the base of the pipe fracturing or bursting, the material valve 64 of the Y fitting 50 is closed so no further material 40 flows through the Y fitting 50. However, the water valve of the Y fitting 50 is kept open so that water can continue to flow through the third wire braided flexible hose 60 and flush out and cleanse the third wire braided flexible hose 60. Once the flushing of the second wire braided flexible line is complete, typically after a few minutes of only water flowing through it, the second end of the third wire braided flexible hose 60 is attached to the pipe valve 80 of the next pipe through which product 58 is to be pumped, and the material valve 64 of the Y fitting 50 is then reopened so material 40 at a flow rate of between 18 to 40 L per minute mixes with the water and flows out of the next pipe. This process continues until each pipe has been utilized to pump product 58 into the void 12.

The material 40 is a hydrophobic polyurethane, known as Strata AFS™. designed to be injected into rock fissures, gravel layers, joints, cracks and voids to fill voids and consolidate strata. It is ideal for controlling and diverting water, including high volumes of gushing water. The material 40 is Single Component
Cures to a rigid, closed cell polyurethane foam
Free foam expansion up to 30 times
Controlled reaction time
Catalysts required for optimal reactivity
Multiple catalyst options for accelerated reaction times
Resistant to most organic solvents, mild acids, alkali, petroleum and micro-organisms
Contains no volatile solvents
The specific steps to form the plug 10 are as follows:

1. Pump 42 needs to be set up to run a single component material 40. Depending on the pump 42 being used, one piston might have to be unhooked to deliver product 58 to just one side of the pump 42; or if a bigger gear driven pump 42 is used, material 40 is simply supplied to both inlets of the pump 42. An example of a pump 42 that is used for the formation of a plug 10, as described herein, is called the Maximator GX45 PH-B sold by Perforator in Germany.

2. Air needs to be supplied to the pump 42 at a minimum of 90 psi and a water separator needs to be added to the air line along with and automatic oilier to lubricate the pump 42.

3. Pump 42 needs to be flushed with a pump wash or oil-based product 58 to remove any moisture or water in or to the pump 42.

4. High pressure ½" to ¾" lines/hoses will be run from the pump 42 to the job site and a high-pressure material valve 64 installed on the end of the line. A water line will be run from the closest source of water with a minimum 60 psi to the job site and a check valve and water shut off valve installed. A Y fitting 50 will be installed and both the material 40 line and water line will be attached to the Y fitting 50, and a single supply hose will be added to the end of the Y fitting 50 to attach to the pipes 18 already installed in the roof 26 or project to be pumped.

5. Once the pump 42 is flushed and primed, all the lines running from the pump 42 to the work site need to be flushed as well to remove all moisture to prevent the material 40 from prematurely being exposed to water and begin foaming.

6. Underground temperature and water temp. will determine which type of catalyst 38 we use. There are 3 types of catalyst; regular, fast, extra fast. Each catalyst has its own set reaction time depending on water temp. Regular is typically about 120 seconds or 2 minutes, fast is 90 seconds and extra fast is about 60 seconds. This is based on water temps around 60 degrees. Once the desired catalyst 38 is chosen, the catalyst 38 needs to be mixed for 3 to 5 minutes before it is added to the resin side of the material 40. The reason to mix is to make sure that there is no settling or separation of the catalyst 38. The material 40 is composed of 55.7% Diphenylmethanediisocyanate, isomers and homologues as its active ingredient (specifically 2,2-dimethyl-1-(methylethyl)-1,3-propanediyl bis(2-methylpropanoate) and is called Strata AFS; the fast catalyst is 2,2'-Dimorpholinyldiethyl ether 30-50% by volume and is called Strata AFS FAST; and the extra fast is 2,2'-Dimorpholinyldiethyl ether 50-100% by volume and is called Strata AFS EXTRA FAST. All these catalysts and the Strata AFS can be purchased from Strata Worldwide LLC, Canonsburg, Pa. 15317; and details and information regarding mixing of the Strata AFS and each of the three catalysts can be obtained therefrom. A third catalyst, known as CUT CAT PURE, 2,2'-Dimorpholinyldiethyl ether 10-20% by volume, is available from GCP Applied Technologies, Cambridge, Mass. 02140.

7. Once the catalyst 38 is mixed, it is added to the resin side of the material 40. A paddle mixer is installed in the drum or tote depending on the volume of work that needs to be done and turned on. While the mixer is running, the catalyst 38 is slowly poured into the resin and allowed to mix for 15 mins or until a good roll of the material 40 in the drum or tote is achieved. The mixer will continue to run until the material 40 is ¾ of the way down, at which point the mixer is moved to the next drum or tote and the process is continued. The material 40, properly mixed with catalyst 38, is provided to the material pump inlet 70. For purposes herein, material 40 downstream of the pump 42 is understood to be material 40 with catalyst 38.

8. A sample is pulled from the mixed material 40 and catalyst 38 and a small amount is mixed with the water on site to obtain the set and reaction time of the product 58. This will allow the user to know the time available to move from one pipe to the next pipe before the product 58 will set up in the nozzle or line. If it is anticipated a shut down or the pump 42 goes down, the valves can be shut at the end of the lines and flushed with water to keep the lines clear.

9. Once the material 40 is mixed, it is gravity fed into the already flushed and primed pump 42, using the material 40 to push the pump 42 flush or oil-based product 58 out.

10. Once the material 40 has reached the end of the first hose 46, water is added to the Y, just to verify the pump 42 flush or oil is completely cleaned from the lines. Once it is verified the lines are clear and the foam 16 is reacting to the water like it should, the third hose 60 is ready to be hooked to the pipes 18 and pumping is started.

11. If the void 12 to be plugged is largely fractured rock that a false bottom could not be constructed in, mixing sticks 20 can be added to the pipe to achieve a quicker set up of the foam 16. 3 mixing sticks with 12 flutes per stick can be added to give the product 36 revolutions of mixing prior to leaving the pipe, which will eliminate the product 58 from just running down until the reaction time of the catalyst 38 has been reached.

12. Starting to apply the foaming product 58 at the point where the fall or cave or void 12 has returned back to the normal height of the seams will allow the hardened foam 16 to reach the highest compressive strength to eliminate the rock from spalling or falling out any further.

13. Based on the height of the void 12 and the length of the void 12, numerous pipes 18 will be installed are various heights and widths to make sure all areas of the void 12 or cavity will be filled.

14. A typical void 12 or cavity will have pipes that extend up 20', 15', and 10' in height to make sure that all levels are covered, and every 4' to 6' on the horizontal and 1' to 2' in depth.

15. Pumping through pipes 18 will typically start on one end of the fall then move to the other end of the fall, then jump every other to every third pipe, then back to the pipes 18 in-between until feedback out of the pipes installed at the 10' or 15' marks is achieved. Several pipes will be left towards the ends and middle in pockets that have been created in the plug being formed to come back to and pressure everything up. The pockets are created by pumping the product so it hardens at spaced apart locations in the void 12 but which link together along their extremity so defined closed pockets are created. In these confined spaces that the pockets define, the product is pumped into. The closed pocket allows the product to build up in pressure, since the product has nowhere else to flow. The pumped product continues to flow into this limited confined space of the pocket and continues to become denser and denser as it cures. The cured and hardened product in the pocket is consequently denser than the initial product that was pumped to form the pockets, since there is no confined space yet defined to allow the product to collect and become denser as it cures and more product flows into the same space. Instead, the initial flow of product does to some extent pressurize on itself by the front or lead of the product that flows out and foams and cures defining a front wall with the product that flows out of the same pipe that follows runs up against this newly created front wall and starts backing up and building up off the front wall until the product cures and hardens in the pipe and prevents further product from flowing. These front walls of hardened product are then used to build upon with subsequent product flowing out of other pipes strategically positioned in the void 12 to create the pockets and build off of the newly defined front faces of product that has already flowed out of other pipes already. Basically, one is trying to achieve a box or frame around the void 12, then the inside of the box around the void 12 is pressured up to achieve the highest compressive strength possible. Pipes are positioned inside the box at various heights to provide the product to the inside of the box and fill the box which is a confined closed space.

16. Once pumping is complete, the pump 42 is shut off and the material valve 64 at the end of the first hose 46 of the material 40 line is closed and the end of the Y fitting 50 is flushed out with water to clear out the product 58 from the Y fitting 50 and third hose 60. The water line is unhooked from the first hose 46, and pump flush or an oil-based product 58 is run through the first hose 46 to remove any of the product 58 left in the first hose 46. Once everything is run out of the hoses, a bypass valve is opened on the pump 42 and the pump 42 is flushed out to remove any material 40.

17. The piston and valve would then be cleaned on the pump 42 and piston re-honed and the pump 42 would be lubricated and made ready for the next job.

The following is an example of the application of Strata AFS high expansion foam 16 on 10 Right Longwall Panel at Tunnel Ridge Mine (WV) for the purpose of securing unstable roof conditions and allowing the progression of longwall system 66 to advance.

Tunnel Ridge Project.

The Circumstances on the 10 Right longwall panel at Tunnel Ridge mine were unique in that their longwall 76 was only 31.5 feet from its completion and subsequent recovery. The recovery process requires that a large piece of industrial strength polymer mesh be installed above the shield supports 36 prior to the completion of the panel. A large roll of mesh, roughly 35' wide×the length of longwall 76 face 82, is pulled onto the longwall 76 face 82 roughly 35' (10 passes) prior to the end of the panel. The roll is then suspended from the tips of the shields 34 and made to drape over top of the shield canopies as the shields 34 advance on each of the final 10 passes. The mesh unrolls between the shields 34 and the exposed roof 26. Here, the recovery mesh had already been pulled onto the longwall 76 face 82 but had not yet been draped over the shield canopies. The roof 26 had begun to deteriorate and several different voids were present along the face 82 totaling an area of roughly 460' long×6' high×6' wide. Voids of a much greater magnitude have been successfully filled, including some that have measured over 50' high, with massive pieces of loose sandstone exposed. The major concern for this project however, was the limited distance left to advance in the panel; and the inability to initiate the "draping" of the mesh over the shield canopies for recovery. A significant amount of loose material 40 laying on the shields 34 and the absence of a competent roof 26 to "pinch" and hold the mesh above the canopies had halted production entirely.

The Process.

Either end of the longwall 76 face 82 is referred to as a Gate End. The end where power and fluid are supplied; and the coal travels off the section is known as the Headgate. The opposite end of the longwall 76 system 66 is known as the Tailgate. The gate ends are series of tunnels (entries and crosscuts) that were developed prior to the installation of the longwall 76 system 66, around the rectangular block of coal that makes up the longwall 76 panel, by another method known as Continuous Mining. The gates provide access to the longwall 76 face 82 for miners, equipment, supplies, and fresh air. The materials needed to complete the project were delivered to the mine 14 and sent underground to the Tailgate of affected longwall 76.

These materials consisted of:

1. 80 kits of Strata AFS 2-part foam material—each kit consists of 1) 55-gallon drum and 1) 5 gallon can of STRATA AFS FAST catalyst 38.

2. 1 pump to transfer material from the tailgate to the affected areas of the longwall 76 face 82.

3. 1,200' of ½" staple lock hose. The staple lock hose comes in 50' sections and is coupled together from the pump 42 to the affected area.

4. 60 sections of ½" PVC pipe and accompanying fittings. PVC pipe serves as the pipe and is used at the injection sites to disperse the material into the void 12 once mixed with water. PVC pipes are often connected together by the men operating the nozzles (nozzle men) to reach different distances.

5. 50 sheets of ½" plywood and 50 2×4's. Plywood and 2×4's are used to create a temporary false floor 28 from the tips of the shield supports 36 to the coal face 82 wherever the distance between them cannot be sealed by other means. The 2×4's act as poles 32 to support the ends of the plywood sheets hanging off the shield supports 36.

6. 20 "Foam Packs". Foam packs are also a 2-part expansive foam material used on a much smaller scale in the mining industry for sealing ventilation controls in the mine 14. They are similar to foam insulation you can buy in a hardware store. Foam packs are used to seal gaps at and around the injection site. Small gaps are present between shield supports 36, between sheets of plywood etc. These are almost always a company supplied item.

7. 1 Strata Job Box. The job contains various fittings, tools, spare parts and accessories for the project.

8. 500' of 1" air hose. 1" air hose supplies compressed air to the Strata pump 42 from a larger pipe already present in the mine 14, or from an onsite compressor if "mine air" is not present or is of an inadequate volume.

Set Up

Set up for the foam project at Tunnel Ridge began as soon as the required materials reached the Tailgate section. The set-up process took approximately 2 hours.

The set-up process consisted of:

Pump 42 Station Set Up.

1. The pump 42 was set up in the Tailgate entry, just out by the longwall 76 face 82. The pump 42 was connected to the mine's 4" airline using the Strata supplied 1" air hose. Several kits of foam 16 were delivered to the pump 42 in preparation to dispense material. 1" suction and ½" discharge hoses were connected to the pump 42.

2. ½" staple lock hose was stretched out and coupled together from the pump 42 all the way to the Headgate end of the affected area to form the first hose 46.

3. Once the pump 42 and lines were established, 8) five-gallon cans of hydraulic oil were cycled through the pump 42 and discharge line to flush any moisture from all components. Once the catalyst 38 is added to the ASF material, the presence of moisture in the pumping system 66 or discharge line will react with the material and render them inoperable.

Preparation of the Affected Areas on the Longwall 76 Face 82.

1. For this application, the ½" plywood was cut into 4'×4' sections and hand carried along with 2×4's to the affected areas to build the false floor 28 between the shield tips and the face 82 from which the void 12 extended. Construction of false flooring began on the area closest to the Tailgate first and progressed toward the Headgate. The plywood was placed over top of the shield tips and against the coal face 82. 2×4's were cut to desired height at the affected areas and installed beneath the plywood to brace it off of the mine 14 floor.

2. Company supplied foam 16 packs were also carried on the face 82 and used to seal small cracks present between shields 34, plywood etc. to prevent or greatly limit the discharged product 58 from possibly leaking through the false floor 28 before it cures and be wasted.

3. Various lengths of PVC pipe were installed as the plywood floor was constructed for later use to pressurize the foam 16 after initially filling the void 12. Lager access holes were also left in the false floor 28 roughly every 30' for the nozzle men to observe the application.

Injection of AFS.

1. 30 minutes prior to completion of the setup, 1) five-gallon can of catalyst 38 shaken well and poured into the first 55-gallon drum of AFS material. The air powered mixer was inserted into the drum and began mixing the two components together. Adequate mixing of both parts is crucial to the desired end product 58. Each kit was mixed for a minimum of 30 minutes before being injected on the face 82. The mixer was moved to the next kit when the previous kit was ½ empty. The same general rules apply when using totes vs. 55-gallon drums. A tote is equivalent to five kits of AFS. Therefore 5) five-gallon buckets of catalyst 38 are added to each tote and it is mixed until ½ empty before moving the mixer to the next tote.

2. The material injection line of the first hose 46 is connected to the first input port on a staple lock "Y" fitting at the injection site. The other input side, the second input port, of the Y contains the ½" staple lock water supply line of the second hose 54. The water supply hose is connected to the water system 66 on the longwall 76 shield supports 36, which act as the water source 52. A check valve is installed in the water supply line of the second hose 54 to ensure that AFS material cannot enter the shield water system 66. The output port, the third port 62, on the Y fitting 50 is connected to a length of PVC pipe with the third hose 60 having the mixing sticks 20 that ultimately delivers the final product 58 to the affected area. The staple lock Y fitting 50 is where AFS mixes with water to form the product 58 that travels to and through the PVC pipe. There are shut off valves located on both the material 40 and water supply hoses at the Y to regulate the flow of both liquids.

3. Within 60 to 90 seconds of being dispensed from the PVC pipe, AFS begins to expand rapidly filling the void 12. The nozzle men are able to move the PVC pipe and direct the flow of material 40. Nozzle men observe for leaks beneath the shields 34 while applying the material 40, constantly adjusting the direction of flow and working the material 40 closer to them until they must seal the access hole and continue filling the void 12.

4. Once the void 12 is filled, previously installed PVC pipes are connected to the Y fitting 50 in turn and more material 40 is injected to pressurize the foam 16. The pressurizing of the material 40 gives it the strength to withstand the set pressure of the shield supports 36.

5. This process continued toward the headgate end of the affected area until all voids were filled.

Upon completion of the foam 16 application, the shields 34 can be advanced freely with no effect on or from the preexisting bad roof 26/void 12. In the case of Tunnel Ridge, AFS successfully filled the void 12 and captured all loose rock that was present above the shield supports 36. Draping the recovery mesh over top of the shield canopies was no longer an issue and the product 58 allowed the shields 34 to pressurize and advance from that point forward.

Example 2

Blue Mountain Energy Deserado Mine located in Rangely, Colo. was having issues with their top falling above their shields 34 in the longwall 76. The top was caving in above the longwall 76 shields 34 from shield 98 to 114 anywhere from 20 to 100 feet high and 90 feet long.

After getting material 40 and equipment to the mine 14, the pumping station was set up in the last open cross cut of the longwall 76; which consisted of a Maximator pump, 275-gallon totes of Strata AFS, 5-gallon pails of Strata EXTRA FAST catalyst 38, and an air driven drum mixer. Job boxes were brought in with the tools and fitting needed to pump foam 16; which included ½ inch Y's, ½ inch valves, ½ inch PVC couplers, ½ inch staples, ½ inch×10 ft. PVC pipe, ½ inch 5075 PSI hose assemblies @ 50 ft. lengths, 50 ft. of clear 1-inch suction hose, PVC cement and primer, ½ inch F×F coupler, ½ inch check valves, and assortment of hand tools used to perform the job. The mine 14 air was connected to the pump 42 and mixer and the mixing process was started.

The mixing process of Strata AFS and 5-gallon pails of Strata EXTRA FAST catalyst 38 proceeded, which are 5 five-gallon pails per tote. The purpose of the catalyst 38 determines the reaction time of the material 40 to start foaming. There are 3 types of catalysts 38. They are CUT CAT PURE, Strata FAST, and Strata EXTRA FAST. For this specific job, Strata FAST and Strata EXTRA FAST catalyst 38 was chosen as best for this application because of the size and area of the open void 12. While the tote was mixing, a half inch staple lock high pressure hose was run to the affected area going to be pumped. It was approximately 800 feet from pump 42 to caved area. After the half inch line was set up, the construction of the false roof 26 began.

A false floor 28 was built between the shield tips and the longwall 76 face 82. It was anywhere from 8 foot to 12-foot tip to face 82. The false roof 26 consists of ½ inch plywood, 2×4's and also 2×12's. The 2×12's were run from the tip of the shield out to the face 82 of coal with a 2×4 on the face 82 side of the 2×12 as a kicker to support and hold up the 2×12 and plywood. After the forms were up and stable, the plywood was installed plywood.

After the false floor 28 was complete the half inch PVC pipe was run. Typically, 1-2 PVC pipes were installed at every shield in the affected area. One was installed at the tip of the shield and one was installed at the face 82 of the coal. The PVC pipes are usually 10-30 foot but the size can vary and they are placed above the shield. Once all the PVC pipes are installed, a mine 14 foam pack is used to seal up any holes or cracks in the plywood false floor 28, which helps prevent the Strata AFS from leaking through the false flor. While the false floor 28 is being built, a communication line is run from the pump station to the cave area.

Next, hydraulic oil is pumped through the pump 42 and ½-inch material 40 line to get out any moisture in the material 40 line or pump 42. After hydraulic has been pumped through the line, the suction end of the pump 42 is connected to the tote of Strata AFS with a 1-inch clear suction hose from the bottom of the tote. Strata AFS material 40 is then pumped up the line until all the hydraulic is cleared and it is pure Strata AFS material 40 in the first hose 46. A cup test is performed to make sure that the product 58 is performing as expected. After the cup test passes, a 3-way Y fitting 50 is connected to the end of the first hose 46. The first port 48 of the Y fitting 50 receives the material 40, the second port 56 of the Y fitting 50 is connected to a ½ inch water hose that is coming off of the shield with a ½ inch check valve installed to prevent the Strata AFS material 40 to run back through the shields 34, and the third port 62 of the Y fitting 50 is the end that hooks up through the third hose 60 to a ½ inch female staplelock to PVC adapter on the PVC pipe in the false floor 28. Water is injected into the material 40 through the Y fitting 50. As the material 40 with catalyst 38 and the water travels through the third hose 60 with mixing sticks 20 and PVC pipes together, it mixes and begins the reaction of the Strata AFS and begins to start foaming.

On this specific job pumping was started at shield #104, which was the middle of the cave. Pumping was started in a PVC pipe that was directed towards the face 82 and 10 feet high. After pumping one tote through this PVC pipe, pumping was then moved to the PVC pipe that was at the shield tip on 104 which ran 20 ft. up into the cave area. After pumping a tote through that pipe, pumping was moved down two shields 34 to shield #102, and then the process was repeated at shield #104. From #104, pumping was moved to shield #98 and the process was repeated.

Essentially, boxes of foam 16 are being built above the shields 34 in the voided area by pumping at specific shields 34 first to create a foundation. To then help to be able to pressurize the foam 16 against each other to build the strength, it is necessary to consolidate the rock and hold the foam 16 up above the shields 34. This process was repeated for the entire area of the cave which was shields 98-114. This resulted in pumping a blanket of foam 16 above the shields 34 up to 30 ft. high from the face 82 to the tips of the shields 34 which then holds up the loose material 40 above the shields 34 and doesn't allow the rocks or material 40 to fall down through the shields 34 to the conveyer. This allows the shields 34 to pressurize against the foam 16 ultimately resulting in allowing the longwall 76 shields 34 and conveyer to advance without further interruption, and in this case it did just that. They were able to advance their shields 34 without any further rock falling into the conveyer.

The properties of Strata AFS, and the catalysts Strata AFS Fast and Strata AFS Extra Fast are as follows:

Properties

| Strata AFS Resin | | |
|---|---|---|
| Solids | 100% | ASTM D2369 |
| Viscosity | 200 cPs at 77° F. | ASTM D2196 |
| Color | Black-Brown Liquid | |
| Density | 1.10 g/cm3 | ASTM D4659 |
| Flashpoint | 293° F. | ASTM D93 |
| Corrosiveness | Non-Corrosive | |

| Strata AFS Cured | | |
|---|---|---|
| Density confined | 1.00 g/cm3 | ASTM D3574 |
| Density free | 2 PCF | ASTM D3574 |
| Compressive | 4351 psi | confined |
| Flexural | 2320 psi | confined |
| Free Foam | 4 psi | unconfined |

| Strata AFS Fast | | |
| --- | --- | --- |
| Viscosity | 20 cPs at 77° F. | ASTM D2196 A |
| Color | Transparent Red Liquid | |
| Density | 0.973 g/cm3 | |
| Flashpoint | 257° F. | ASTM D93 |

| Strata AFS Extra Fast | | |
| --- | --- | --- |
| Viscosity | 20 cPs at 77° F. | ASTM D2196 A |
| Color | Transparent Red Liquid | |
| Density | 1.000 g/cm3 | |
| Flashpoint | 257° F. | ASTM D93 |

Reaction Times

| 10% Strata AFS Fast | | | |
| --- | --- | --- | --- |
| Temp | Start | End | Foam Factor |
| 27° F. | 30" | 1'40" | 20 V |
| 40° F. | 28" | 1'25" | 26 V |
| 50° F. | 26" | 1'23" | 26 V |
| 60° F. | 23" | 1'20" | 28 V |
| 68° F. | 23" | 1'20" | 30 V |
| 77° F. | 20" | 1'20" | 32 V |

| 10% Strata AFS Extra Fast | | | |
| --- | --- | --- | --- |
| Temp | Start | End | Foam Factor |
| 27° F. | 25" | 1'15" | 24 V |
| 40° F. | 23" | 1'10" | 28 V |
| 50° F. | 23" | 1'10" | 28 V |
| 60° F. | 23" | 1'05" | 30 V |
| 68° F. | 20" | 1'05" | 30 V |
| 77° F. | 18" | 1'05" | 32 V |

Figure 9:
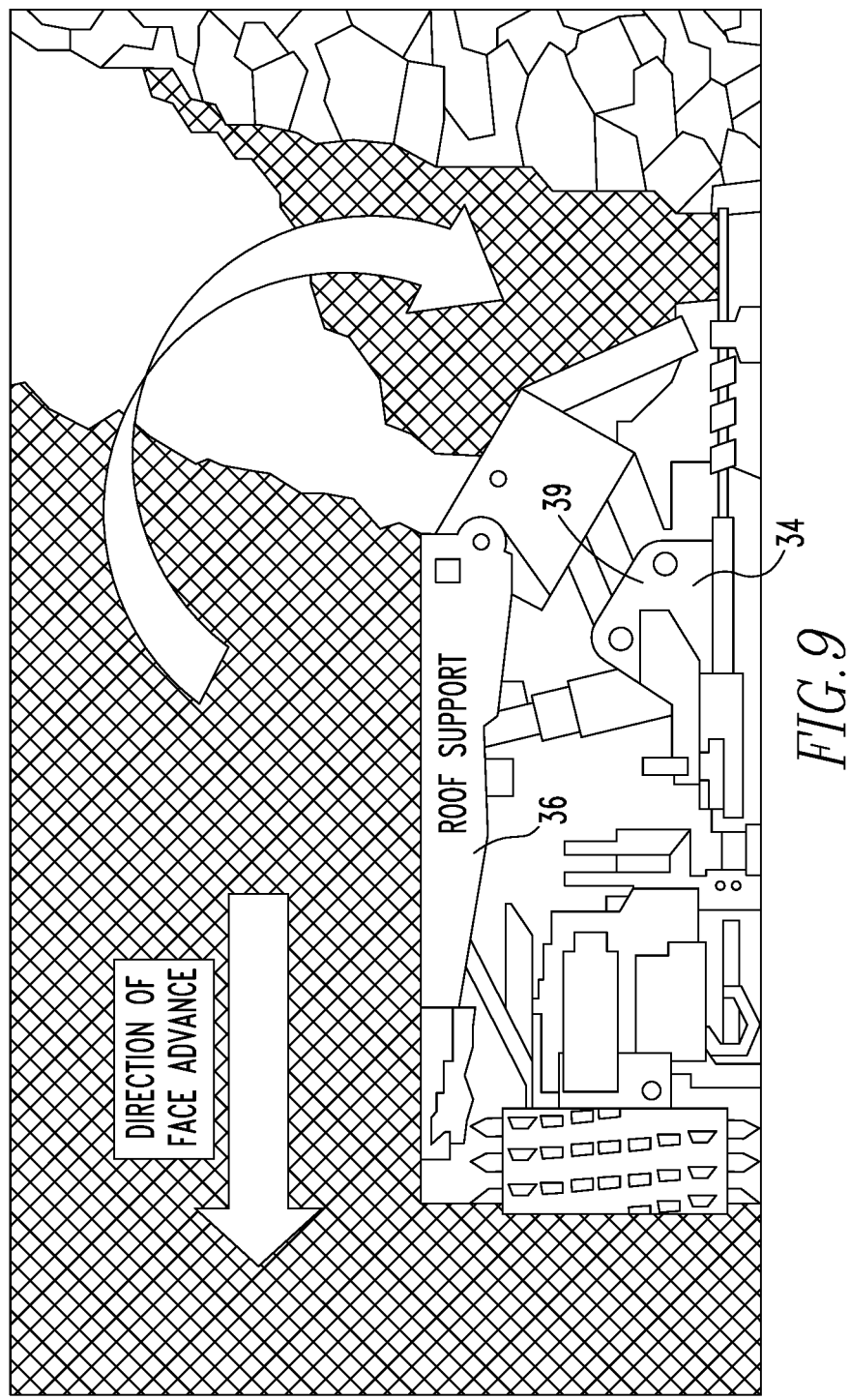
FIG. 9 is a side view of a longwall shield, shearer and face conveyor.

FIG. 9 is a side view of a longwall 76 shield, shearer and face 82 conveyor. Shields 34 drop, advance, repressurize, and push the conveyor forward as the shearer makes passes. (FIG. 9 shows an additional conveyor behind the shields 34, not applicable to aforementioned example where immediate roof is rock and not coal).

Figure 10:
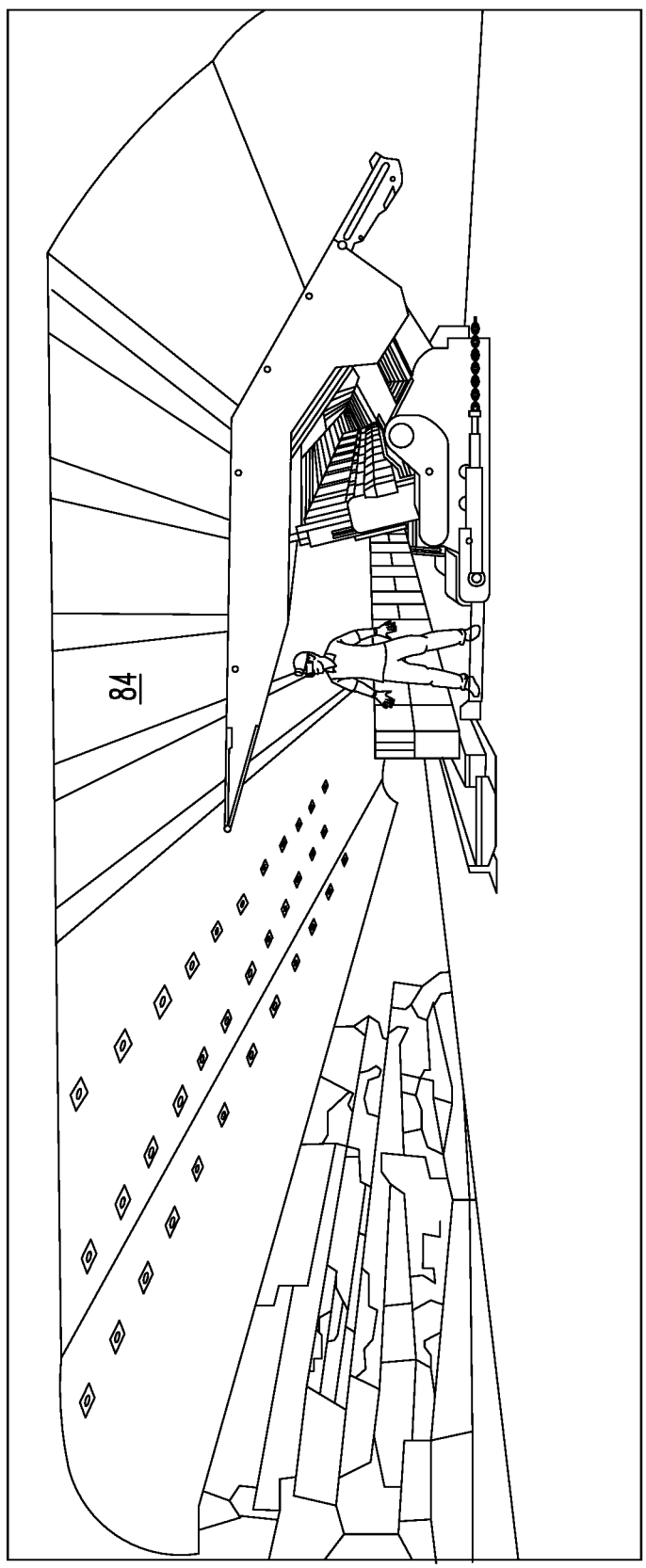
FIG. 10 shows a recovery mesh on the longwall face in a roll and suspended from the shield supports.

FIG. 10 shows a recovery mesh is initially pulled onto the longwall 76 face 82 in a roll and suspended from the shield supports 36. The end is draped over the shield supports 36 and it unrolls between the shields 34 and the roof 26 as the shields 34 advance.

Figure 11:
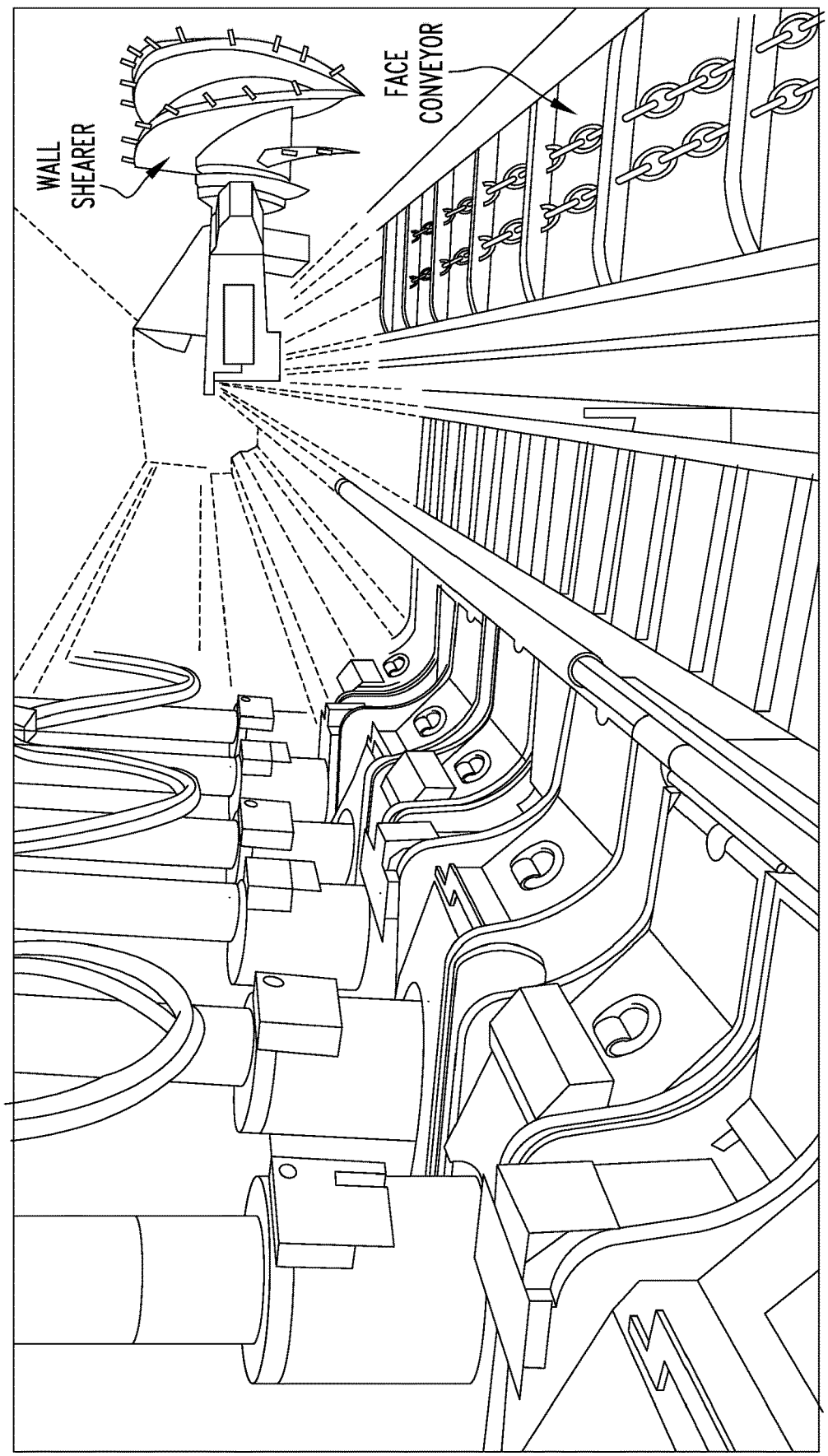
FIG. 11 shows hydraulic shields and shield supports, wall shearer and face conveyor.

FIG. 11 shows hydraulic shields 34 with shield supports 36, wall shearer and face conveyor.

Figure 12:
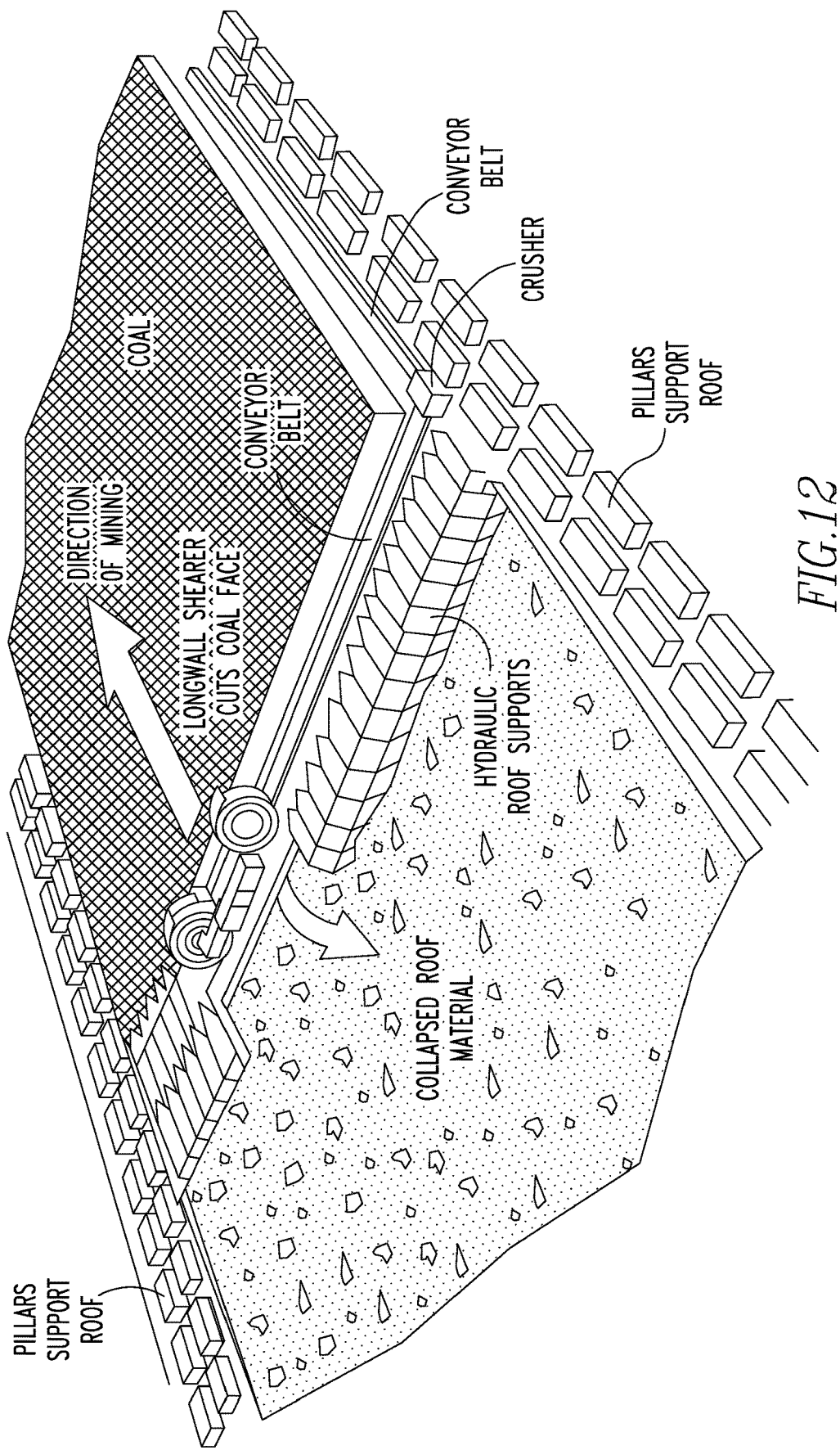
FIG. 12 is a schematic representation of an operational mine.

FIG. 12 is a schematic representation of an operational mine 14.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for forming a plug in a void of a mine comprising the steps of:
placing a plurality of pipes throughout the void;
adding a catalyst to a single component material;
providing the single component material with the catalyst to a pump which pumps only the single component material with the catalyst;
supplying air to the pump while the pump is pumping the single component material with the catalyst through a first hose attached to a first port of a y fitting;
supplying water through a second hose to a second port of the y fitting so the water and single component material with the catalyst merge in the y fitting to create a product, the catalyst used being a function of ambient temperature about the void and a temperature of the water; and
placing the product with a third hose that extends from the y fitting on outer most areas of the void and moving the product to a middle of the void, where the product expands when the product releases into the void from the third hose and cures to a rigid closed cell foam to form a plug in the void, wherein the placing the product step includes the steps of connecting the third hose to a first pipe of the plurality of pipes and flowing the product to the first pipe so the product flows out of the first pipe into the void, after which the product foams and hardens.

2. The method of claim 1 including the step of connecting the third hose to a second pipe of the plurality of pipes and flowing the product through the second pipe so the product flows out of the second pipe into the void, after which the product foams and hardens.

3. The method of claim 2 including the steps of disconnecting the third hose on the first pipe, closing a material valve to stop flow of material to the Y fitting and flushing the third hose clean with water flowing from the water inlet of the Y fitting.

4. The method of claim 3 wherein the placing the pipes step includes the step of placing pipes in the void at least about every 10 feet apart lengthwise across the void and about at least every 5 feet apart depth wise across the void.

5. The method of claim 4 wherein the placing the product step includes the steps of creating pockets in the plug being formed when the product cures and hardens and then placing the product from the third hose into the pockets through pipes disposed in the pockets to strengthen the plug against forces.

6. The method of claim 5 wherein the placing the pipes step includes the step of placing a false floor at the void with a long wall shield, the pipes extending from the false floor into the void.

* * * * *